United States Patent
Jadhav et al.

(10) Patent No.: US 11,722,399 B2
(45) Date of Patent: *Aug. 8, 2023

(54) APPARATUS AND METHOD FOR OPTIMIZED ROUTE INVALIDATION USING MODIFIED NO-PATH DAO SIGNALING

(71) Applicant: HUAWEI TECHNOLOGIES CO., LTD., Guangdong (CN)

(72) Inventors: Rahul Arvind Jadhav, Bangalore (IN); Rabi Narayan Sahoo, Bangalore (IN); Zhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

This patent is subject to a terminal disclaimer.

(21) Appl. No.: 17/379,408

(22) Filed: Jul. 19, 2021

(65) Prior Publication Data

US 2022/0060406 A1 Feb. 24, 2022

Related U.S. Application Data

(63) Continuation of application No. 16/445,805, filed on Jun. 19, 2019, now Pat. No. 11,070,462, which is a (Continued)

(30) Foreign Application Priority Data

Dec. 19, 2016 (IN) .............................. 201641043305

(51) Int. Cl.
*H04L 45/121* (2022.01)
*G06F 16/901* (2019.01)
(Continued)

(52) U.S. Cl.
CPC ........ *H04L 45/121* (2013.01); *G06F 16/9024* (2019.01); *H04L 45/02* (2013.01);
(Continued)

(58) Field of Classification Search
None
See application file for complete search history.

(56) References Cited

U.S. PATENT DOCUMENTS

| 7,181,442 B2 | 2/2007 | Yeh et al. |
| 9,438,479 B1 | 9/2016 | Friedman et al. |

(Continued)

FOREIGN PATENT DOCUMENTS

| CN | 102404817 | 4/2012 |
| CN | 106162795 | 11/2016 |
| WO | 2009007630 | 1/2009 |

OTHER PUBLICATIONS

Carels et al., "RPL Mobility Support for Point-to-Point Traffic Flows towards Mobile Nodes" International Journal of Distributed Sensor Networks, XP002794809, Jun. 28, 2015, 14 pages.

Cheshire et al., "DNS-Based Service Discovery," Internet Engineering Task Force; RFC 6763, Feb. 2013, 49 pages.

(Continued)

*Primary Examiner* — Faruk Hamza
*Assistant Examiner* — Cassandra L Decker
(74) *Attorney, Agent, or Firm* — Fish & Richardson P.C.

(57) ABSTRACT

The present disclosure relates to apparatus and methods for route invalidation. In one example method, a common ancestor node of a network determines switching of a parent node of a node based on an update message received from the node using a new routing path established based on the switching of the parent node. The common ancestor node generates a No-Path message based on the update message. The No-Path message is for invalidating a previous routing path associated with the node on the switching of the parent node. The update message comprises at least one bit authorizing generation of the No-Path message by the common ancestor node. The at least one bit is placed in a transit information option in the update message.

20 Claims, 14 Drawing Sheets

Related U.S. Application Data continuation of application No. PCT/CN2017/105886, filed on Oct. 12, 2017.

(51) Int. Cl.

| | | |
|---|---|---|
| *H04L 45/02* | (2022.01) | |
| *H04L 45/021* | (2022.01) | |
| *H04L 45/12* | (2022.01) | |
| *H04L 45/00* | (2022.01) | |
| *H04L 45/28* | (2022.01) | |
| *H04L 45/48* | (2022.01) | |
| *H04W 84/18* | (2009.01) | |

(52) U.S. Cl.
CPC .......... *H04L 45/021* (2013.01); *H04L 45/123* (2013.01); *H04L 45/22* (2013.01); *H04L 45/26* (2013.01); *H04L 45/28* (2013.01); *H04L 45/48* (2013.01); *H04W 84/18* (2013.01)

(56) References Cited

U.S. PATENT DOCUMENTS

| | | |
|---|---|---|
| 2009/0154482 A1 | 6/2009 | Ham et al. |
| 2013/0227336 A1 | 8/2013 | Agarwal et al. |
| 2014/0126423 A1 | 5/2014 | Vasseur et al. |
| 2015/0381473 A1 | 12/2015 | Murakami et al. |
| 2016/0330107 A1 | 11/2016 | Thubert et al. |
| 2017/0034041 A1 | 2/2017 | Carofiglio et al. |
| 2017/0207967 A1 | 7/2017 | Thubert et al. |

OTHER PUBLICATIONS

Dunkels, et al., "Contiki—a lightweight and flexible operating system for tiny networked sensors," Proceedings of the 29th Annual IEEE International Conference on Local Computer Networks (LCN'04), Nov. 2004, 8 pages.

Extended European Search Report issued in European Application No. 17882976.8 dated Oct. 18, 2019, 5 pages.

Gullman, "Autoconfiguration for IP networking: Enabling Local Communication," IEEE Internet Computing 5(1), May-Jun. 2001, pp. 81-86.

Jadhav et al., "No-Path DAO Problem Statement: draft-jadhav-roll-no-path-dao-ps-00," Roll WG Internet-Draft, Feb. 25, 2016, 8 pages.

Liu et. al., "Load Balanced Routing for Low Power and Lossy Networks," 2013 IEEE Wireless Communications and Networking Conference (WCNC), Shanghai, China, Apr. 2013, pp. 2238-2243.

Osterlind et al., "Cross-Level Sensor Network Simulation with COOJA," Proceedings of the 31st Annual IEEE Conference on Local Computer Networks, Nov. 2006, pp. 641-648.

PCT International Search Report and Written Opinion issued in International Application No. PCT/CN2017/105886 dated Jan. 15, 2018, 11 pages.

Shelby, "CoRE Resource Directory: IETF draft draft-ietf-core-resource-directory-02," CoRE Internet-Draft, Nov. 9, 2014, 37 pages.

Tripathi et al., "Quantifying Load Imbalance: a Practical Implementation for Data Collection in Low Power Lossy Networks," 2013 47th Annual Conference on Information Sciences and Systems (CISS), Mar. 2013, 6 pages.

Winter, et al., "RPL: IPv6 Routing Protocol for Low-Power and Lossy Networks," Internet Engineering Task Force; RFC 6550 (Proposed Standard), Mar. 2012, 138 pages.

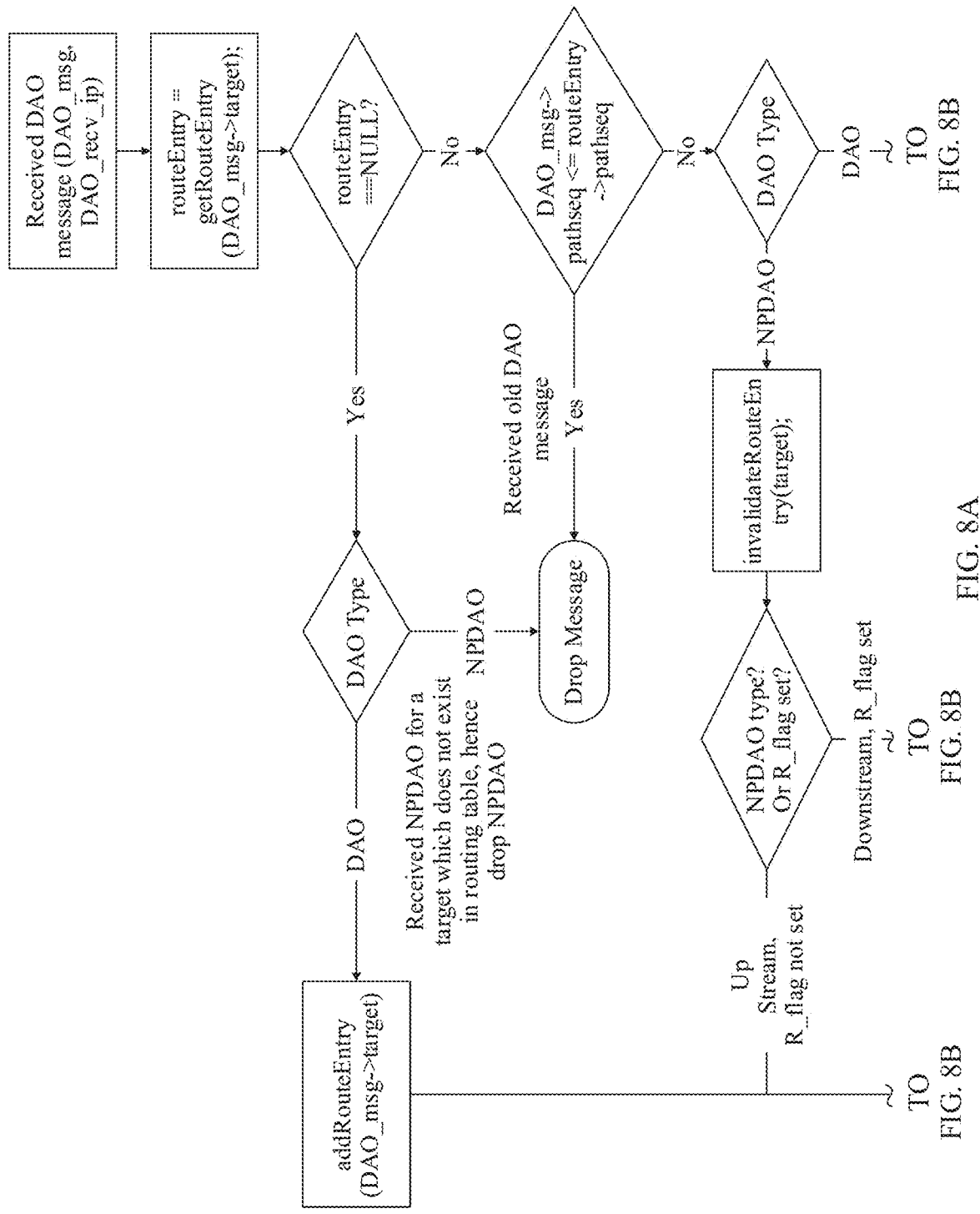

EXISTING

APPARATUS AND METHOD FOR OPTIMIZED ROUTE INVALIDATION USING MODIFIED NO-PATH DAO SIGNALING

CROSS-REFERENCE TO RELATED APPLICATIONS

This application is a continuation of U.S. patent application Ser. No. 16/445,805, filed on Jun. 19, 2019, which is a continuation of International Application No. PCT/CN2017/105886, filed on Oct. 12, 2017, which claims priority to India Patent Application No. IN201641043305, filed on Dec. 19, 2016. All of the aforementioned patent applications are hereby incorporated by reference in their entireties.

TECHNICAL FIELD

The present subject matter described herein, in general, relates to routing of packets in communication networks and more particularly to optimizing route invalidation using modified No-Path DAO signaling.

BACKGROUND

Internet of Things (IoT) enables all the general purpose devices/appliances, sensors/actuators available in the network to be connected to the Internet, thus allowing a greater control in terms of monitoring, commanding these devices from anywhere and anytime. An example to be given is Building Automation where all the sensors (fire sensors, temperature sensors, etc), lights, room curtains, door locks, are connected to the Internet and can be controlled remotely/locally using a mobile application or any other easy-to-use device.

Low-Power and Lossy Networks (LLN) is a network of spatially distributed autonomous and resource constrained sensors/actuators to monitor physical or environmental conditions, such as temperature, sound, pressure, etc and to cooperatively pass their data through the network to a main location. The nodes in such a network are extremely resource constrained and the network is usually bandwidth constrained. Generally, the networks are constructed in a mesh formation such that nodes connect to one or more than one intermediate routers to reach border router. A routing protocol is responsible for identifying optimum paths dynamically, switch paths in case of failures and establish P2P, P2MP, MP2P traffic paths. The protocols are tailored and in some cases redesigned to suit such node/network characteristics. For e.g. a routing protocol such as open shortest path first (OSPF) which is usually well suited for regular non-constrained networks will fail miserably in LLNs because of lossy and constrained nature of the network. Thus a different routing protocol (such as Routing Protocol for LLNs (RPL)) is used in LLNs which are relatively less aggressive to link/path failures i.e. they do not over-react to failures resulting in reduced control overhead.

An exemplary network subsystem is as shown in FIG. 1. The devices as shown in FIG. 1 usually form a network in an ad-hoc mode wherein devices connect to each other to eventually reach a Border Router (BR) through which the devices are connected to the Internet.

As discussed in RFC6550, RPL specifies a proactive (i.e. paths are formulated before the data exchange begins) distance-vector based routing scheme. Destination Oriented Directed Acyclic Graph (DODAG) Information Object (DIO) messages are percolated downstream to establish upstream paths. For downstream paths, the specification has an optional messaging in the form of DODAG Advertisement Object (DAO) messages using which the 6LBR can learn route towards any of the nodes. In storing mode, DAO messages would result in routing entries been created on all intermediate hops from the node's parent all the way towards the 6LBR.

RPL allows use of No-Path DAO (NPDAO) messaging to invalidate a routing path (the process of route deletion is also called route invalidation) and thus releasing of any resources utilized on that path. An NPDAO is a DAO message with route lifetime of zero, signaling route invalidation for the given target. All the DAO messages are always sent upstream in the network as per the current specification. RPL introduced NPDAO messaging in the storing mode so that the node switching its current parent can inform its parents and ancestors to invalidate the existing route. Subsequently parents or ancestors would release any resources (such as the routing entry) it maintains on behalf of that child node. The NPDAO message always traverses the RPL tree in upward direction, originating at the target node itself.

For example, FIG. 2 illustrates a network topology implementing DAO and NPDAO signalling. As shown in FIG. 2, Node (D) is connected via preferred parent (B). (D) have an alternate path via (C) towards the BR. Node (A) is the common ancestor for (D) for paths through (B)-(G) and (C)-(H). When (D) switches from (B) to (C), RPL suggests sending No-Path DAO to (B) and regular DAO to (C). The NPDAO via (B) should clear routing states along the path (B)→(G)→(A)→(BR). A subsequent DAO from (D) via (C) should create new routing path via (C)→(H)→(A)→(BR).

Nodes in LLNs are generally resource constrained. There is limited memory available and routing entry records are the one of the primary elements occupying dynamic memory in the nodes. Route invalidation helps the router nodes to decide which entries could be discarded to better achieve resource utilization in case of contention. Thus it becomes necessary to have an efficient route invalidation mechanism. Further, it is observed that a single parent switch may result in a "sub-tree" switching from one parent to another. Thus the route invalidation needs to be done on behalf of the sub-tree and not the switching node alone. Referring again to FIG. 2, when Node (D) switches parent, the route invalidation needs to be done for (D), (E) and (F). Thus without efficient route invalidation, a router may have to hold a lot of unwanted route entries.

As per technical observations, a person skilled in the art understands that a node switches the parent and may employ No-Path DAO messaging when:

Current parent becomes unavailable because of transient or permanent link or parent node failure.

The node finds a better parent node i.e. the metrics of another parent is better than its current parent.

The node switches to a new parent whom it "thinks" has a better metric but does not in reality.

The usual steps of operation when the node switches the parent is that the node sends a NPDAO message via its current parent to invalidate its current route and subsequently it tries to establish a new routing path by sending a new DAO via the new parent.

However, the existing mechanisms providing the NPDAO have certain limitations and hence disadvantages, some of the technical drawbacks are as discussed below:

Lost NP-DAO due to Link break to the previous parent: When the node switches the parent, the NPDAO is to be sent via the previous parent and a regular DAO via its new parent. In cases where the node switches the parent because of transient or permanent parent link/node failure then the NPDAO message is bound to fail. RFC6550 assumes communication link with the previous parent for NPDAO messaging. Further RFC6550 mentions use of route lifetime to remove unwanted routes in case the routes could not be refreshed. But route lifetimes in case of LLNs could be substantially high and thus the route entries would be stuck for long.

Invalidate routes to dependent nodes of the switching node: NPDAO is sent by the node who has switched the parent but it does not work for the dependent child nodes below it. RFC6550 does not specify how route invalidation will work for sub-child's resulting in stale routing entries on behalf of the sub-child's on the previous route. The only way for a router to invalidate the route entries for dependent nodes would be to use route lifetime expiry which could be substantially high for LLNs. Thus, for network topology as shown ion FIG. 2, when Node (D) switches its parent, Node (D) generates an NPDAO on its behalf Post switching, Node (D) transmits a DIO with incremented DTSN so that child nodes, node (E) and (F), generate DAOs to trigger route update on the new path for themselves. There is no NPDAO generated by these child nodes through the previous path resulting in stale entries on nodes (B) and (G) for nodes (E) and (F).

Route downtime caused by asynchronous operation of NPDAO and DAO: A switching node may generate both an NPDAO and DAO via two different paths at almost the same time. There is a possibility that an NPDAO generated may invalidate the previous route and the regular DAO sent via the new path gets lost on the way. This may result in route downtime thus impacting downward traffic for the switching node. Thus, for network topology as shown ion FIG. 2, consider Node (D) switches from parent (B) to (C) because the metrics of the path via (C) are better. Note that the previous path via (B) may still be available (albeit at relatively bad metrics). An NPDAO sent from previous route may invalidate the existing route whereas there is no way to determine whether the new DAO has successfully updated the route entries on the new path. An implementation technique to avoid this problem is to further delay the route invalidation by a fixed time interval after receiving an NPDAO, considering the time taken for the new path to be established. Coming up with such a time interval is tricky since the new route may also not be available and it may subsequently require more parent switches to establish a new path.

Impact on P2P traffic: The P2P traffic in the previous sub-DODAG will be impacted because the route entries in the sub-DODAG are stale and does not reflect the latest state of network information. Referring now to FIG. 3, a network topology showing problems associated with the NPDAO messaging is shown. As shown in FIG. 3, NPDAO takes a path which the target decides not to use. The dependent nodes (E) and (F) never generate NPDAO, and thus there is no route invalidation for them. The impact of this is that the NPDAO and DAP takes different paths and are asynchronous. In P2P traffic, when node (J) sends a communication packet to (E), (G) will try to route through (B) and it will fail.

In order to solve the issues associated with the existing mechanisms providing the NPDAO, the prior-art provides certain solution as provided below:

NPDAO can be generated by the parent node who detects link failure to the child: According to RFC6550, RPL states mechanisms which could be utilized to clear DAO states in a sub-DODAG. Section 11.2.2.3 of the RFC6550 states with DAO inconsistency loop recovery, a packet can be used to recursively explore and clean up the obsolete DAO states along a sub-DODAG. Thus in the sample topology in FIG. 2, when Node (B) detects link failure to (D), (B) has an option of generating an NP-DAO on behalf of Node (D) and its sub-child's, (E) and (F).

NP-DAO can be generated once the link is restored to the previous parent: This solution solves a specific scenario of transient links. The child node can detect that the connection to previous parent is restored and then transmit an NP-DAO to the previous parent to invalidate the route. This scheme is stateful, thus requires more memory and solves a specific scenario.

Thus it may be noted form the above that, the technical problems associated with the solutions mentioned is that they cater to specific scenarios such as transient links. Further, there are problems associated with asynchronous generation of NPDAO from two different nodes for the same target.

In detail, the DAO state information in the form of path sequence plays a major role. Every target is associated with a path sequence number which relates to the latest state of the target. The Section 7.1 of the RFC6550 explains the semantics of path sequence number. According to it, the target node increments the path sequence number every time it generates a new DAO. The router nodes en-route utilizes this path sequence number to decide the freshness of target information. If a non-target node has to generate an NP-DAO then it could use following two possibilities with Path Sequence number: Let the Path Sequence number of old regular DAO that flowed through (B) be x. The subsequent regular DAO generated by Node (D) will have sequence number x+1.

i. Node (B) uses the previous Path Sequence number from the regular DAO i.e. NP-DAO (pathseq⇐x) as shown in FIG. 4 (leftmost).

ii. Node (B) increments the Path Sequence number i.e. NP-DAO (pathseq>x such as x+1, x+2,) as shown in FIG. 4 (rightmost).

In case i, the NP-DAO (pathseq⇐x) will be dropped by all the intermediate nodes since the semantics of Path Sequence number dictates that any DAO with an older Path Sequence number be dropped.

In case ii, there is a risk that the NP-DAO (pathseq>x) traverses up the DODAG and invalidates all the routes till the root and then the regular DAO (pathseq>x) from the target traverses upwards. In this case the regular DAO (pathseq>x) will be dropped from common ancestor node to the root. This will result in route downtime.

Another problem with this scheme is its dependence on the upstream neighbor to detect that the downstream neighbor is unavailable. There are two possibilities by which such detection might be put to work:

i. There is P2P traffic from the previous sub-DODAG to any of nodes in the sub-tree which has switched the path. In the above example, let's consider that Node (G) has P2P traffic for either of nodes (D), (E), or (F). In this case, Node (B) will detect forwarding error while forwarding the packets from Node (B) to (D). But dependence on P2P traffic may not be an optimal way to solve this problem considering the reactive approach of the scheme. The P2P traffic pattern might be sparse and thus such detection might kick-in too late.

ii. The other case is where Node (B) explicitly employs some mechanism to probe directly attached downstream child nodes. Such kinds of schemes are seldom used.

iii. In case of sleepy nodes, RPL messaging cannot depend on any such mechanisms described above.

Therefore, it is desirable to provide a mechanism that not only solves the above recited technical problems but also achieves efficient route invalidation, higher probability of NPDAO messaging success, less stale routes, and reduced control overhead. It is also desirable to provide a mechanism that enables routing tables in nodes to reflect latest state of network.

The above-described deficiencies of existing mechanisms for NPDAO messaging are merely intended to provide an overview of some of the problems of conventional systems/mechanism/techniques, and are not intended to be exhaustive. Other problems with conventional systems/mechanism/techniques and corresponding benefits of the various non-limiting embodiments described herein may become further apparent upon review of the following description.

SUMMARY

This summary is provided to introduce concepts related to optimizing route invalidation using modified No-Path DAO signaling, and the same are further described below in the detailed description. This summary is not intended to identify essential features of the claimed subject matter nor is it intended for use in determining or limiting the scope of the claimed subject matter.

The object of the present application is to provide apparatus and method for optimized route invalidation using modified no-path DAO signaling.

According to a first aspect, a method for invalidating a routing path on switching of a parent node. The method includes determining, by at least one common ancestor node of a network, switching of the parent node associated with at least one node based on at least one update message received from the at least one node using a new routing path established on switching of the parent node; and generating, by the at least one common ancestor node, at least one No-Path message for invalidating the routing path associated with the at least one node on switching of the parent node.

When using the method according to the first aspect, the method achieves efficient route invalidation, higher probability of NPDAO messaging success, less stale routes, and reduced control overhead, and enables routing tables in nodes to reflect latest state of network.

According to the first aspect, in a first possible implementation manner of the first aspect, the method further comprises representing the network by a Destination Oriented Directed Acyclic Graph (DODAG), wherein nodes in the graph represent at least the parent node, the common ancestor node, or the node, and the common ancestor node is a root nodes root in the DODAG, and directed edges represent the links between the node, wherein the at least one common ancestor node of the network is a node having at least two nodes as descendants (the parent node and/or the nodes) in the DODAG.

According to the first aspect or the above possible implementation manners of the first aspect, in a second possible implementation manner of the first aspect, wherein the routing path associated with the at least one node is a path established for communication before switching of the parent node.

According to the first aspect or the above possible implementation manners of the first aspect, in a third possible implementation manner of the first aspect, wherein the at least one update message is received from the at least one node while establishing new paths in the network upon switching of the parent node.

According to the first aspect or the above possible implementation manners of the first aspect, in a fourth possible implementation manner of the first aspect, wherein the at least one node and the at least one common ancestor node are communicably coupled.

According to the first aspect or the above possible implementation manners of the first aspect, in a fifth possible implementation manner of the first aspect, wherein the at least one update message is a destination oriented directed acyclic graph advertisement object (DAO) message.

According to the first aspect or the above possible implementation manners of the first aspect, in a sixth possible implementation manner of the first aspect, wherein the at least one No-Path message is a No-Path destination oriented directed acyclic graph advertisement object message (NP-DAO) message.

According to the first aspect or the above possible implementation manners of the first aspect, in a seventh possible implementation manner of the first aspect, wherein the at least one common ancestor node determines switching of the parent node associated with the at least one node for generating the at least one No-Path message by detecting that the at least one update message received from the at least one node is different from the at least one update message received earlier.

According to the first aspect or the above possible implementation manners of the first aspect, in a eighth possible implementation manner of the first aspect, wherein the at least one common ancestor node determines switching of the parent node associated with the at least one node for generating the at least one No-Path message by utilizing a Path Sequence form the at least one update message received. The at least one common ancestor node comprises a pre-stored Path sequence associated the at least one node before switching of the path, when the at least one update message received, the Path sequence form the at least one update message received is compared with the pre-stored path sequence associated the at least one node, and thereby generating the at least one No-Path message.

According to the first aspect or the above possible implementation manners of the first aspect, in a ninth possible implementation manner of the first aspect, wherein the at least one update message received from the at least one node comprises at least one bit, representing invalidating the routing path, placed in at least a target container or at least a transit information container or any combination thereof, the at least one bit authorizing generation of the at least one No-Path message by the at least one common ancestor node.

According to the first aspect or the above possible implementation manners of the first aspect, in a tenth possible implementation manner of the first aspect, wherein the at least one No-Path message generated comprises at least one bit, representing reverse flag, adapted to traverse the No-Path message downstream/reverse, and placed in a base message level of the No-Path message.

According to the second aspect, a method for invalidating a routing path on switching of a parent node in a network, wherein the network is represented by a Destination Oriented Directed Acyclic Graph (DODAG), the nodes in the graph represent at least the parent node, at least a common ancestor node, or at least a node, and the common ancestor node is a root nodes root in the DODAG, and directed edges represent the links between the node for routing packets between the nodes. The method includes: determining, by the at least one common ancestor node of the network, switching of the parent node associated with the at least one node based on at least one a destination oriented directed acyclic graph advertisement object (DAO) message received from the at least one node using a new routing path established on switching of the parent node; and generating, by the at least one common ancestor node, at least one No-Path destination oriented directed acyclic graph advertisement object message (NPDAO) message for invalidating the routing path associated with the at least one node on switching of the parent node.

According to the second aspect, in a first possible implementation manner of the second aspect, wherein the routing uses a Routing Protocol for Low Power and Lossy Networks (RPL).

According to the second aspect or the above possible implementation manners of the second aspect, in a second possible implementation manner of the second aspect, further includes receiving, by the at least one common ancestor node of the network, the DAO message from the at least one node; determining a mismatch in a next hop of a routing entry associated with a Path sequence pre-stored against a next hop of a routing entry associated with a Path sequence of the DAO message received; and thereby generating, by the at least one common ancestor node, the at least one No-Path destination oriented directed acyclic graph advertisement object message (NPDAO) message for invalidating the routing path associated with the at least one node on switching of the parent node.

According to the second aspect or the above possible implementation manners of the second aspect, in a third possible implementation manner of the second aspect, wherein the NPDAO message traverses downward/downstream along the Path sequence of the DAO message received.

According to the second aspect or the above possible implementation manners of the second aspect, in a fourth possible implementation manner of the second aspect, wherein the at least one DAO message is generated by the at least one node to establish new paths on switching of the parent node.

According to the second aspect or the above possible implementation manners of the second aspect, in a fifth possible implementation manner of the second aspect, further includes utilizing the Path sequence from the at least one DAO message to generate the NPDAO message.

According to the second aspect or the above possible implementation manners of the second aspect, in a sixth possible implementation manner of the second aspect, wherein the at least one update message received from the at least one node comprises at least one bit, representing invalidating the routing path, placed in at least a target container or at least a transit information container or any combination thereof, the at least one bit authorizing generation of the at least one No-Path message by the at least one common ancestor node.

According to the second aspect or the above possible implementation manners of the second aspect, in a seventh possible implementation manner of the second aspect, the at least one No-Path message generated comprises at least one bit, representing reverse flag, adapted to traverse the No-Path message downstream/reverse, and placed in a base message level of the No-Path message.

According to the third aspect, an apparatus for invalidating a routing path on switching of a parent node is provided. The apparatus includes a processor, and a memory coupled to the processor for executing a plurality of modules present in the memory. The plurality of modules includes a determining module, and a generating module. The determining module adapted to determine switching of the parent node associated with at least one node based on at least one update message received from the at least one node using a new routing path established on switching of the parent node. The generating module adapted to generate at least one No-Path message for invalidating the routing path associated with the at least one node on switching of the parent node. Further, the modules, when executed by the processor, cause the processor to perform the method of the first aspect or any one of the possible implementation manners of the first aspect.

According to the fourth aspect, an apparatus for invalidating a routing path on switching of a parent node in a network, wherein the network is represented by a Destination Oriented Directed Acyclic Graph (DODAG), the nodes in the graph represent at least the parent node, at least a common ancestor node, or at least a node, and the common ancestor node is a root nodes root in the DODAG, and directed edges represent the links between the node for routing packets between the nodes is disclosed. The apparatus includes a processor, and a memory coupled to the processor for executing a plurality of modules present in the memory. The plurality of modules includes a determining module, and a generating module. The determining module adapted to determine switching of the parent node associated with the at least one node based on at least one destination oriented directed acyclic graph advertisement object (DAO) message received from the at least one node using a new routing path established on switching of the parent node. The generating module adapted to generate at least one No-Path destination oriented directed acyclic graph advertisement object message (NPDAO) message for invalidating the routing path associated with the at least one node on switching of the parent node. Further, the modules, when executed by the processor, cause the processor to perform the method of the second aspect or any one of the possible implementation manners of the second aspect.

According to the fifth aspect, a computer readable storage medium is provided. The computer readable storage medium stores program codes. The program codes comprise instructions for performing the method of the first aspect or any one of the possible implementation manners of the first aspect.

According to the fifth aspect, a computer readable storage medium is provided. The computer readable storage medium stores program codes. The program codes comprise instructions for performing the method of the second aspect or any one of the possible implementation manners of the second aspect.

In contrast to the available techniques, the present invention provides an apparatus and method for signaling NPDAO messaging which significantly improves the route invalidation efficiency.

Further, the present invention also has technical advantages with respect to the prior-art, some of the advantages are disclosed below:
 i. Efficient route invalidation: The present invention improves the route invalidation by ensuring that the NPDAO signaling happens over an established path.
 ii. Higher probability of NPDAO messaging success: Since the signaling according to the present invention happens over an established path, thus there is higher probability of messaging success.
 iii. Less stale routes: Because of optimal NPDAO messaging according to the present invention, there is less probability of stale routes on the intermediate routers. Thus in case of contention, the node will have better control over which route entries to be evicted.

iv. Routing tables in nodes will reflect latest state of network: Because of optimized messaging according to the present invention the routing table will have less stale entries and thus reflect latest state of network topology.

v. Reduced Control Overhead: The present invention enables NPDAO messaging to happen over only a subset of impacted nodes, thus significantly reducing NPDAO control overhead. In earlier case the NPDAO messaging took place between the switching nodes to all the way till the border router.

Further, in contrast to the existing mechanisms, the present invention provides a way of signaling NPDAO by using a common ancestor node to generate NPDAO rather than the target/switching node itself. Using the changed signaling, the common ancestor node generates an NPDAO on behalf of the target node on receiving a refreshed/updated DAO from an alternate path.

The present invention expects the switching node to send only the regular DAO (which is a conventional procedure for forming a network). In contrast to the existing mechanisms a common ancestor receives a DAO for a target and finds a mismatch in next hop. The mismatch is detected in the next hop in routing entry versus the next hop from which DAO is received. Thus, the common ancestor node is in charge of generating a No-Path DAO on behalf of the switching node.

According to the current RPL specification RFC6550, the DAO message always traverses upstream, thus according to the present invention in contrast to the existing mechanisms and RFC6550, the NPDAO traverses downward/downstream along the previous path, unlike any other DAO.

The various options and preferred embodiments referred to above in relation to the first implementation are also applicable in relation to the other implementations.

BRIEF DESCRIPTION OF THE ACCOMPANYING DRAWINGS

The detailed description is described with reference to the accompanying figures. In the figures, the left-most digit(s) of a reference number identifies the figure in which the reference number first appears. The same numbers are used throughout the drawings to refer like features and components.

FIGS. 8A and 8B illustrates DAO processing, in accordance with an embodiment of the present subject matter.

FIG. 9 (b) illustrates new flags required in DAO base object and Transit information container, in accordance with an embodiment of the present subject matter.

Figure 1:
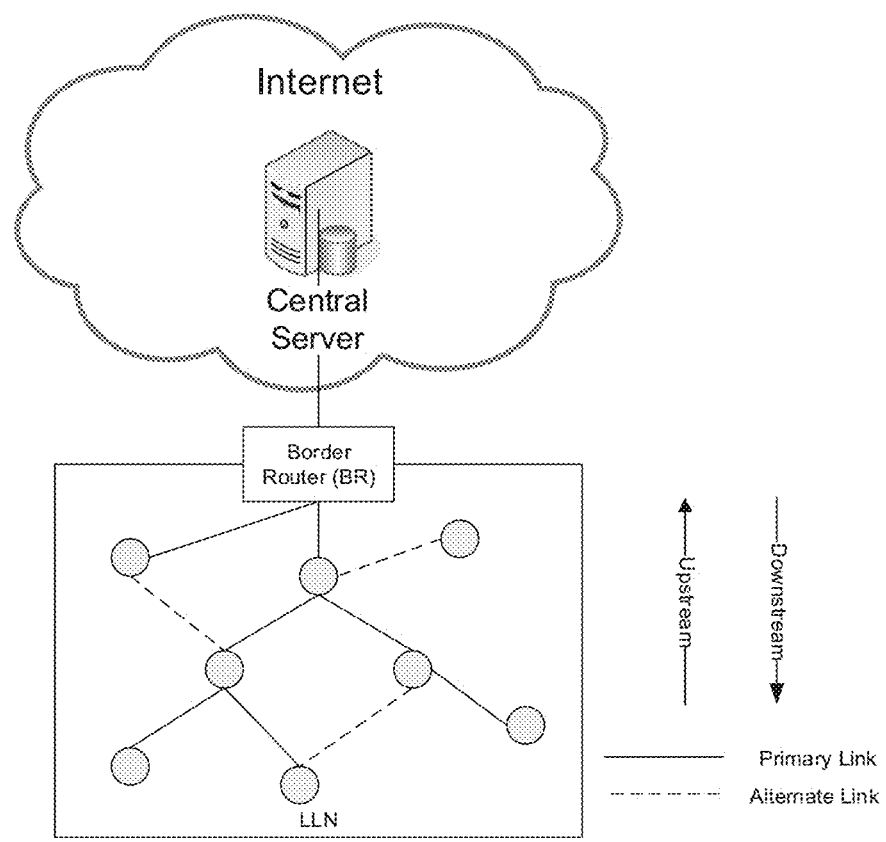
FIG. 1 illustrates an exemplary network subsystem.
Figure 2:
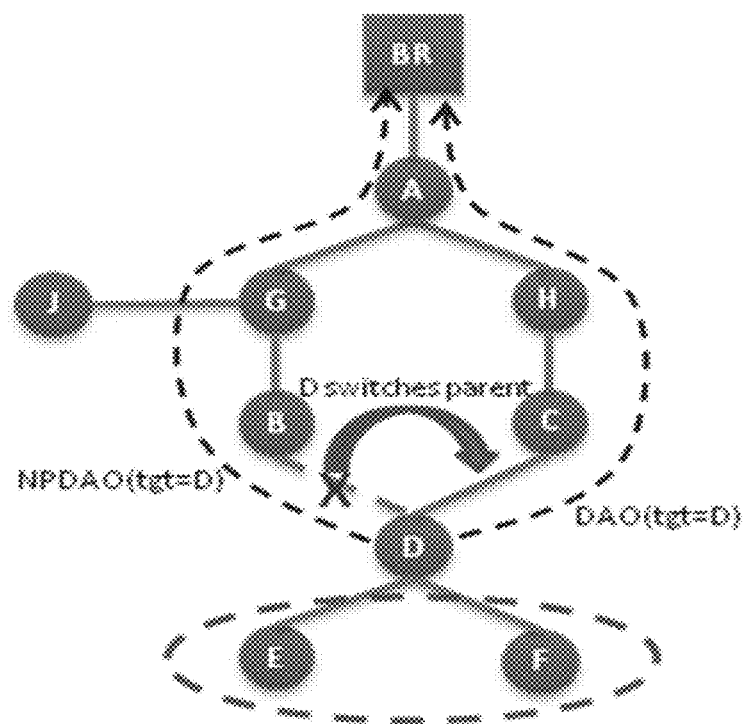
FIG. 2 illustrates a network topology implementing the DAO and NPDAO.
Figure 3:
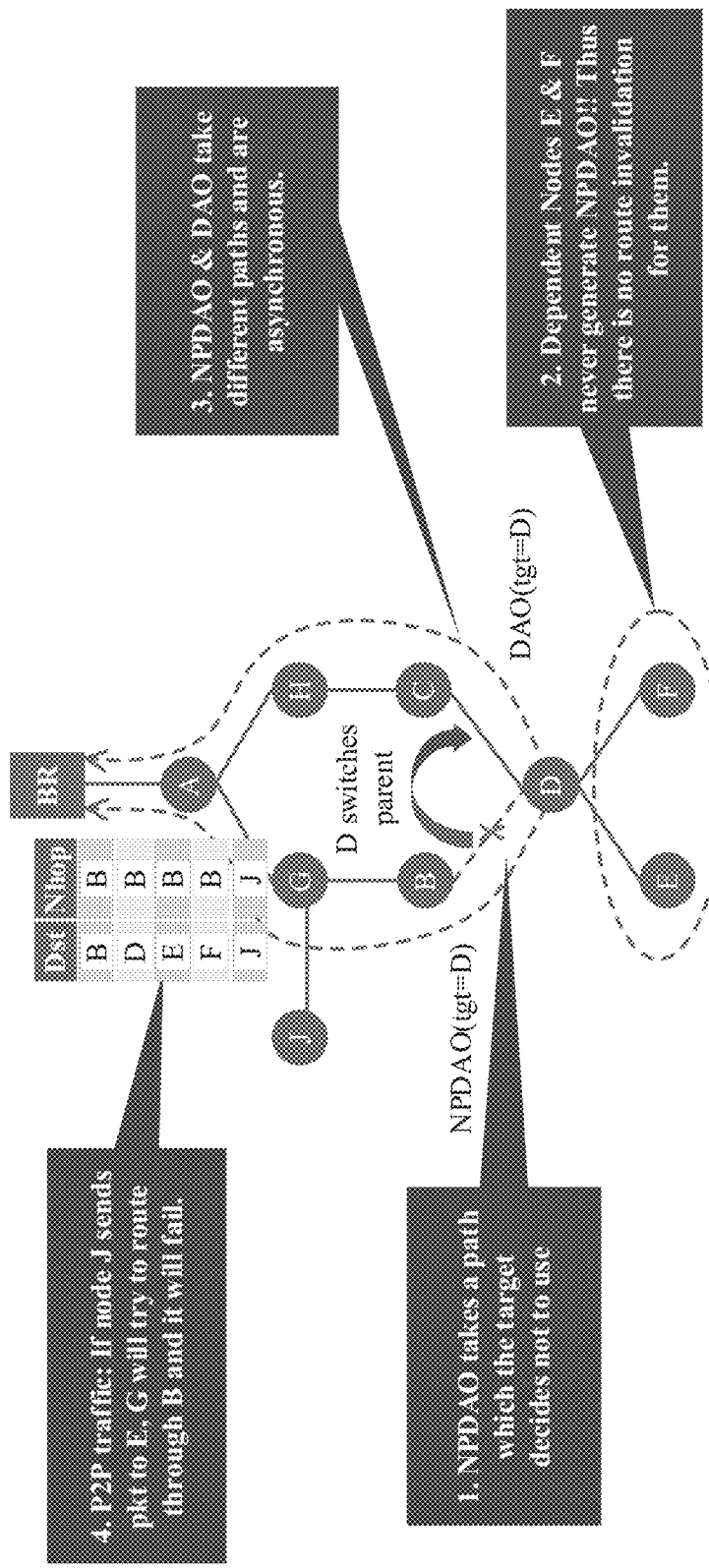
FIG. 3 illustrates a network topology showing problems associated with the current NPDAO messaging.
Figure 4:
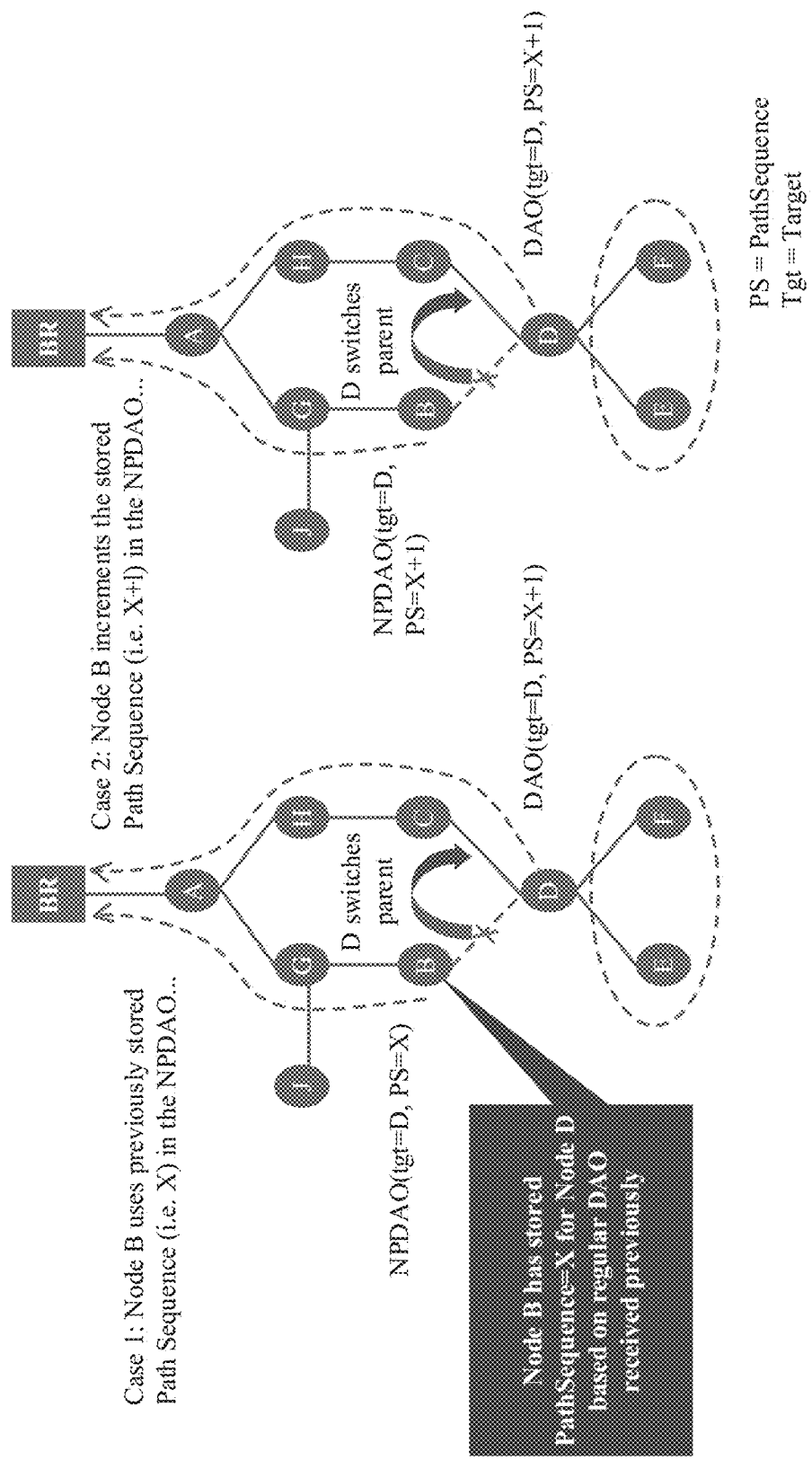
FIG. 4 illustrates an impact of path sequence state on async NPDAO generation.

It is to be understood that the attached drawings are for purposes of illustrating the concepts of the invention and may not be to scale.

DETAILED DESCRIPTION OF THE PRESENT INVENTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The invention can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Apparatus and method for optimized route invalidation using modified no-path DAO signaling are disclosed.

While aspects are described for Apparatus and method for optimized route invalidation using modified no-path DAO signaling, the present invention may be implemented in any number of different computing systems, environments, and/or configurations, the embodiments are described in the context of the following exemplary systems, devices/nodes/apparatus, and methods.

Henceforth, embodiments of the present disclosure are explained with the help of exemplary diagrams and one or more examples. However, such exemplary diagrams and examples are provided for the illustration purpose for better understanding of the present disclosure and should not be construed as limitation on scope of the present disclosure.

The present invention provides a way of signaling NPDAO by using common ancestor node to generate NPDAO rather than the target node itself. Using the changed signaling, the common ancestor node generates an NPDAO on behalf of the target node on receiving a refreshed DAO from an alternate path.

Figure 5:
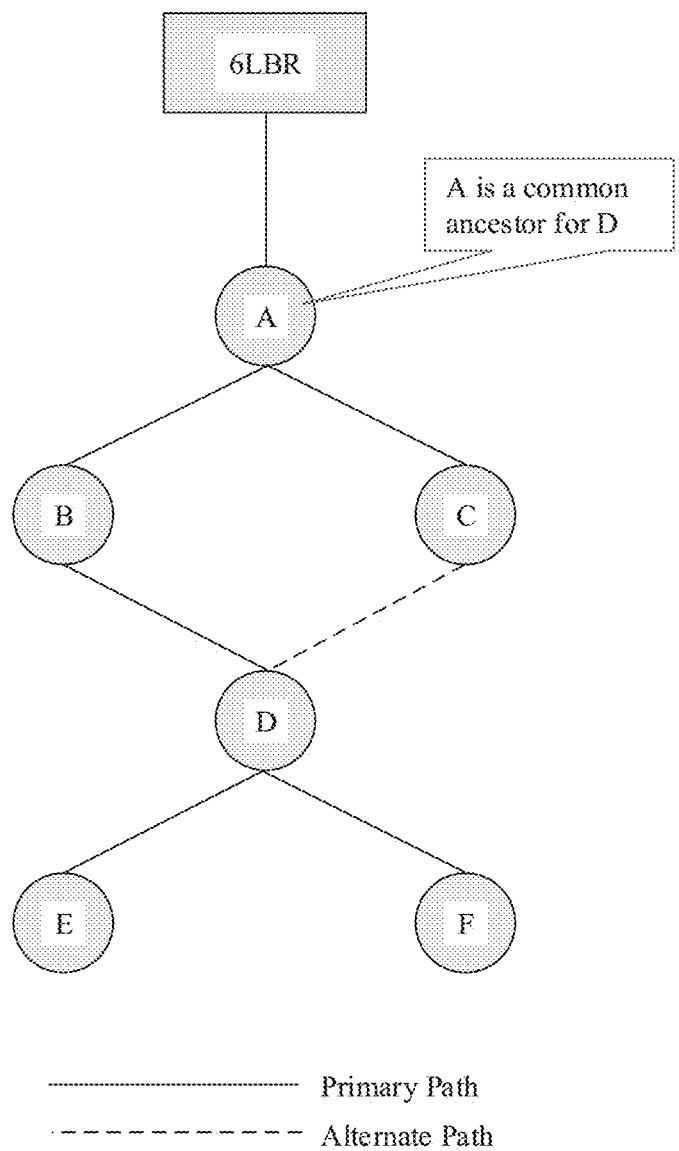
FIG. 5 illustrates a network implementation having a common ancestor.

Referring now to FIG. 5, a network topology is shown. As shown in FIG. 5, node (A) is a common ancestor node of node (D). In graph theory and computer science, the lowest common ancestor (LCA) of two nodes v and w in a tree or directed acyclic graph (DAG) T is the lowest (i.e. deepest) node that has both v and w as descendants, where we define each node to be a descendant of itself (so if v has a direct connection from w, w is the lowest common ancestor).

Thus, according to the present invention, using the changed signaling, the common ancestor node (node A in this case) generates an NPDAO on behalf of the target node on receiving a refreshed DAO from an alternate pat According to the present invention, a switching node (node which switches the parent) sends the regular DAO to a common ancestor node. The common ancestor node is in charge of generating a No-Path DAO (NPDAO) on behalf of the switching node.

The common ancestor receives the DAO from the switching node and finds a mismatch in next hop. Mismatch is detected in the next hop in routing entry versus the next hop from which DAO is received.

The NPDAO traverses downward/downstream along the previous path, unlike any other DAO (note that in current RPL specification, the DAO message always traverses upstream).

Figure 6:
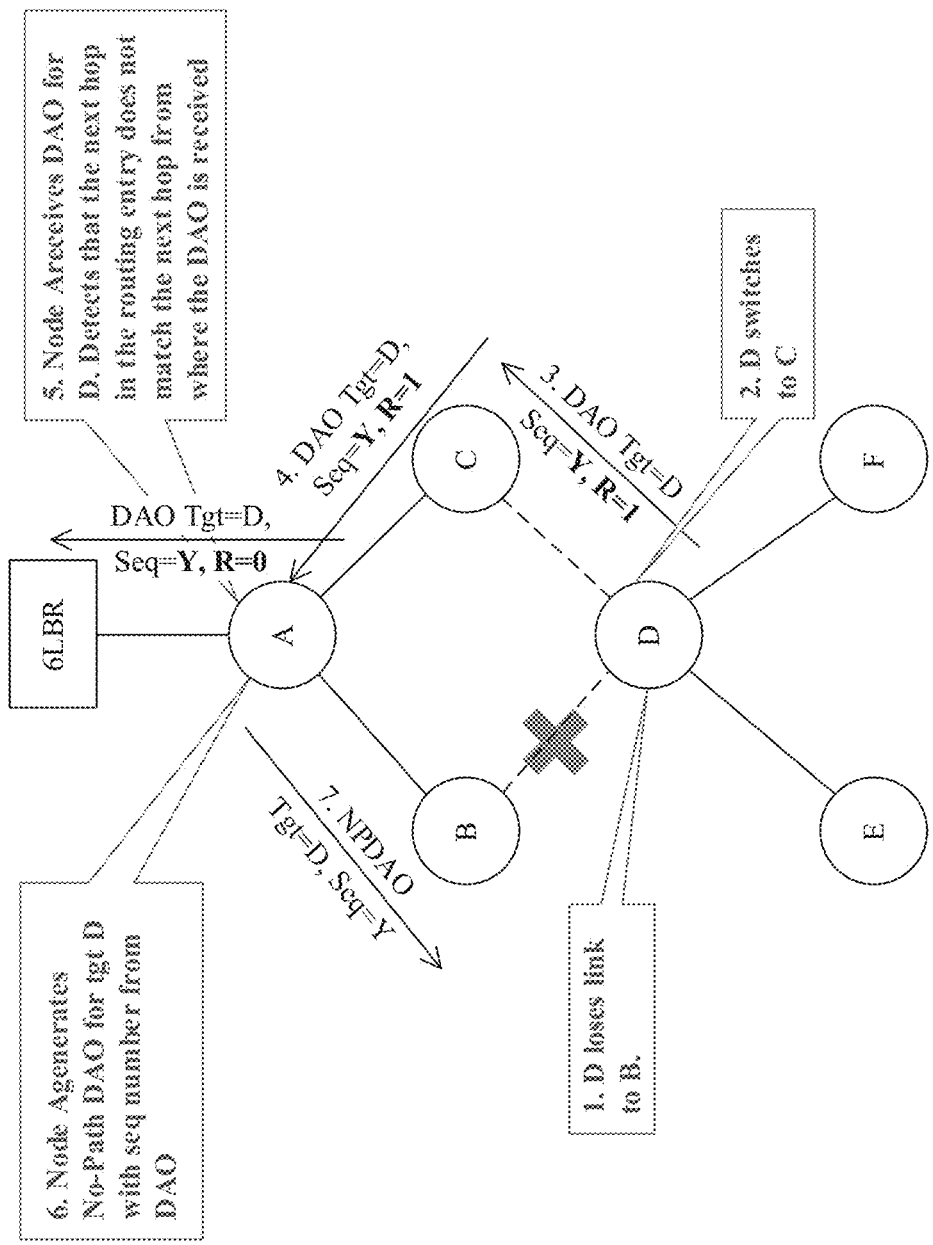
FIG. 6 illustrates a NPDAO signaling, in accordance with an embodiment of the present subject matter.

Referring now to FIG. 6, an NPDAO signaling in accordance with an embodiment of the present invention is illustrated. As shown in FIG. 6, node (D) looses link to its current parent node (B) and accordingly the node (D) switches its parent to new parent, node (C). Node (D) after switching to node (C) communicates a DAO message destined to border router for record and future communication. When Node (A) which is a common ancestor of Node (D) receives the DAO message, Node (A) detects that the next hop in the routing entry does not match with the next hop from where the DAO is received. Upon detection of such change, a NPDAO is generated by the Node (A) of behalf of Node (D) with the sequence number from DAO.

Figure 7:
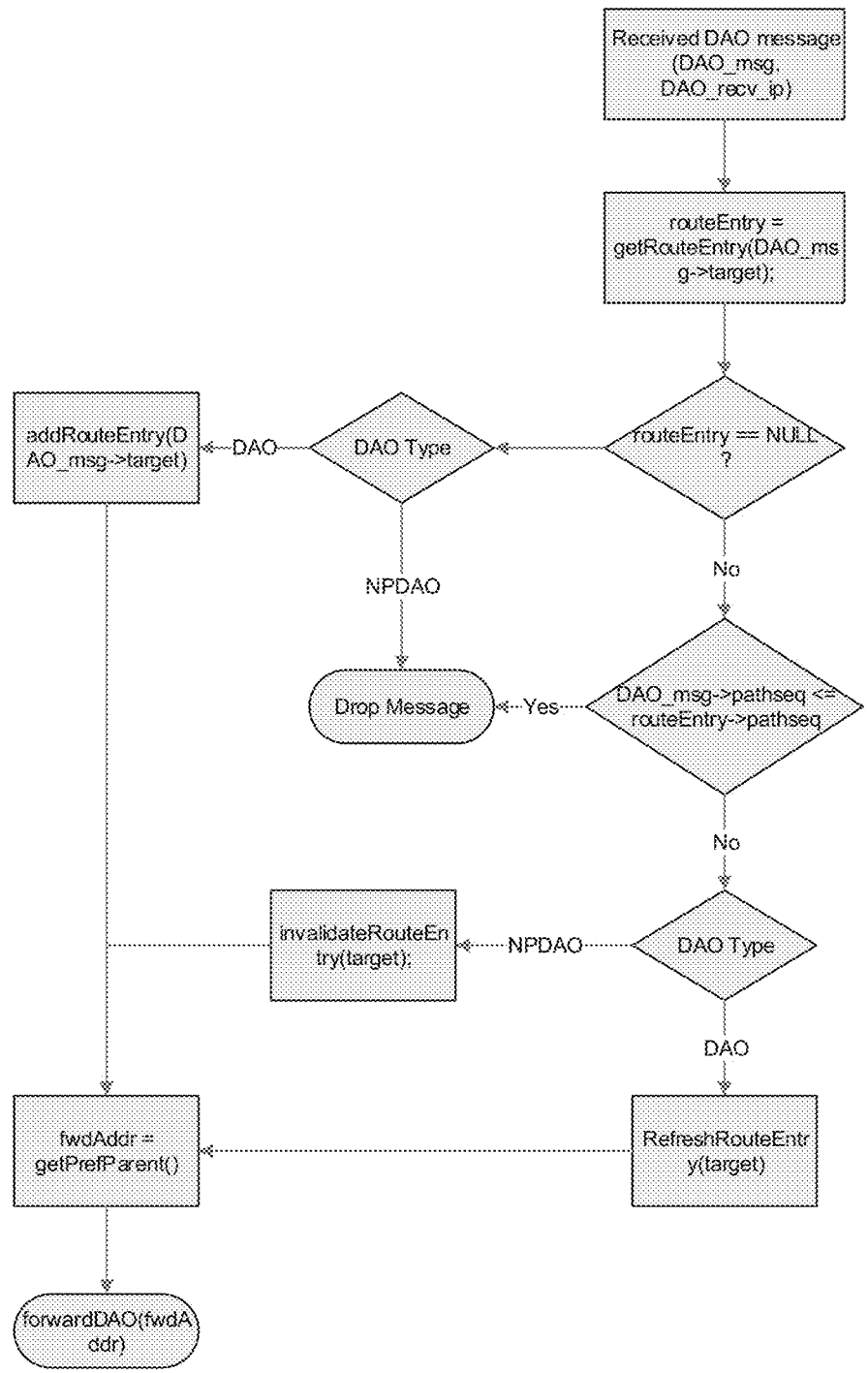
FIG. 7 illustrates a DAO processing according to the prior-art.

Referring now to FIG. 7 a DAO processing flowchart according to the conventional approach is illustrated. DAO and NPDAO messages are used in RPL to update route states for the target. Note that NPDAO is a DAO message with route lifetime field set to zero. A target sends a DAO to establish routes along the path and uses NPDAO to remove the paths. On switching the parent node, a basic requirement for sending NPDAO is that it should be sent along the previous path (i.e. via previous parent node). But using previous path is inefficient because the target node has already switched the path because the path is either unavailable or bad (as in bad metrics). This causes inefficient NPDAO signaling.

Figure 8B:
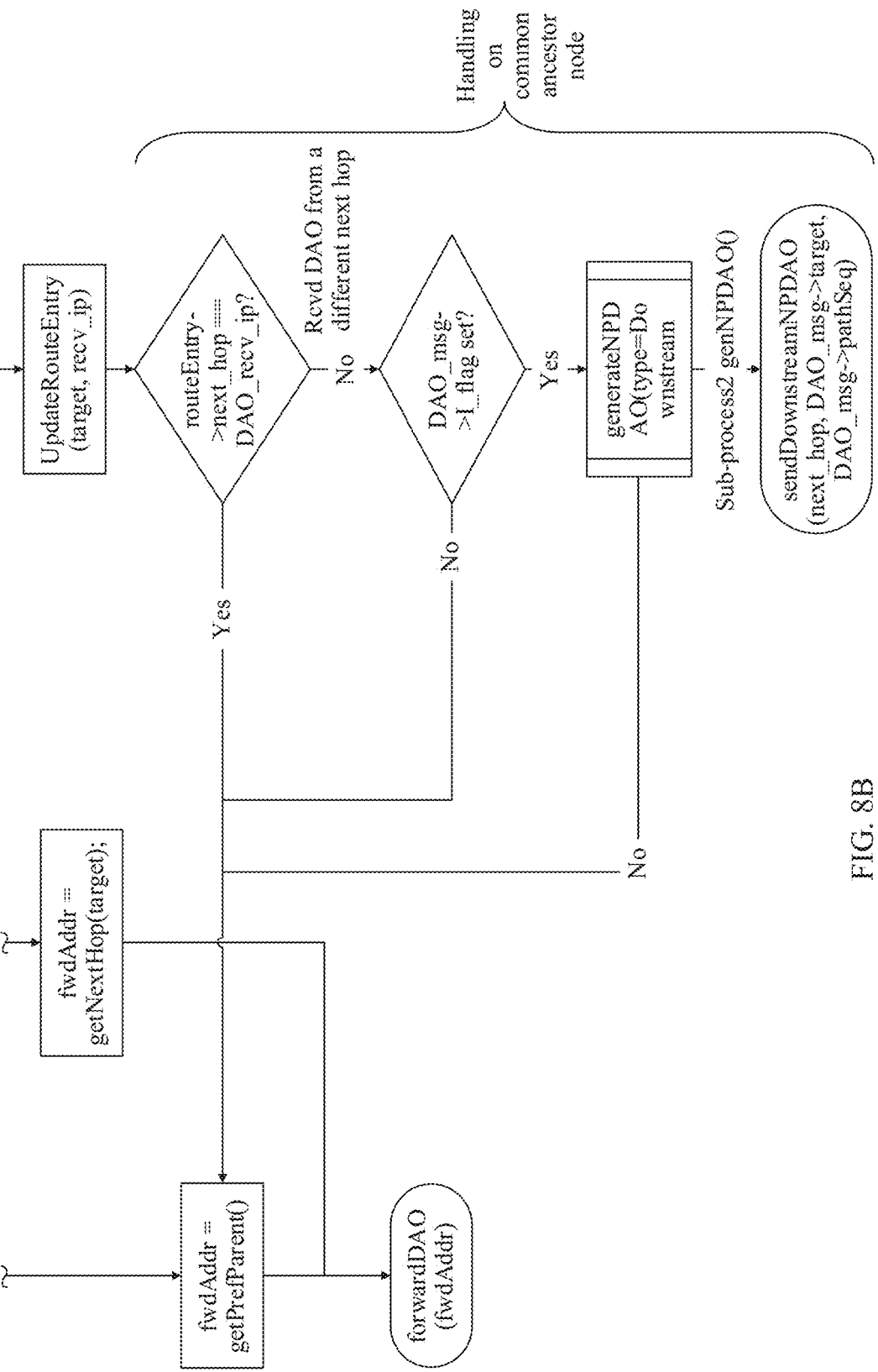

Referring now to FIGS. 8A and 8B a DAO processing flowchart in accordance with an embodiment of the present invention. According to the present invention, the target node (switching node) does not generate the NPDAO. On parent switching the target node generates a regular DAO to establish new paths. This regular DAO on reaching the common ancestor node, the common ancestor node detects that the DAO received is not from the same next hop as stored in the routing entry. This becomes the basis for originating the NPDAO at the common ancestor node. The common ancestor node uses the PathSequence from the regular DAO message to generate the NPDAO.

As shown in FIGS. 8A and 8B, a switching node (node which switches the parent) sends the regular DAO to a common ancestor node. The common ancestor node is in charge of generating a No-Path DAO (NPDAO) on behalf of the switching node.

The common ancestor receives the DAO from the switching node and finds a mismatch in next hop. Mismatch is detected in the next hop in routing entry versus the next hop from which DAO is received.

The NPDAO traverses downward/downstream along the previous path, unlike any other DAO (note that in current RPL specification, the DAO message always traverses upstream).

As shown in FIGS. 8A and 8B, the updated handling on common ancestor node generates NPDAO message on behalf of the target node.

In one implementation, a corresponding pseudo-code for common ancestor node to generate NPDAO message on behalf of the target node is as follows:

```
receiveDAOmessage(DAO_msg, recv_ip)
{
    routeEntry=getRouteEntry(DAO_msg->target);
    if(routeEntry == NULL) {
        if(DAOType == NPDAO)
            return; //drop message, NPDAO received but no entry in route table
        addRouteEntry(DAO_msg->target, recv_ip);
        forwardMsg(DAO_msg, NULL);
```

```
  return; //Added new route entry
}
if(DAO_msg->pathSeq <= routeEntry->pathSeq)
  return; //drop message, old DAO message
if(DAOType == NPDAO) {
  invalidateRouteEntry(DAO_msg->target);
  if(NPDAO is upstream) {
    forwardMsg(DAO_msg, NULL);
    return; //forwarded upstream NPDAO
  }
  fwdAddr=getNextHopAddr(DAO_msg->target);
  forwardDAO(DAO_msg, fwdAddr);
  return; //forwarded downstream NPDAO
}
//regular DAO processing
next_hop=getNextHopAddr(DAO_msg->target);
refreshRouteEntry(DAO_msg->target, DAO_msg, recv_ip);
forwardDAO(DAO_msg, NULL);
if(next_hop == recv_ip) //If the routeEntry's nexthop does not change then return
    return;
    if(DAO_msg->I_flag == 0) // if the I_flag is not set
        return;
//following will be invoked only on common ancestor node for regular DAO msg
generateNPDAO(type=Downstream, DAO_msg->target, DAO_msg->pathSeq);
}
forwardDAO(msg, fwdAddr)
{
  if(fwdAddr == NULL) fwdAddr = getPrefParent( );
  sendMsg(msg, fwdAddr); //send message on network
}
```

The text in bold in the pseudo code above enables the generation of downstream NPAO message on the common ancestor node and processing of such downstream NPDAO messages on intermediate routers. Note that the NPDAO signaling according to the present invention is a backward compatible with the previous NPDAO messaging and can work as an incremental update.

Figure 9A:
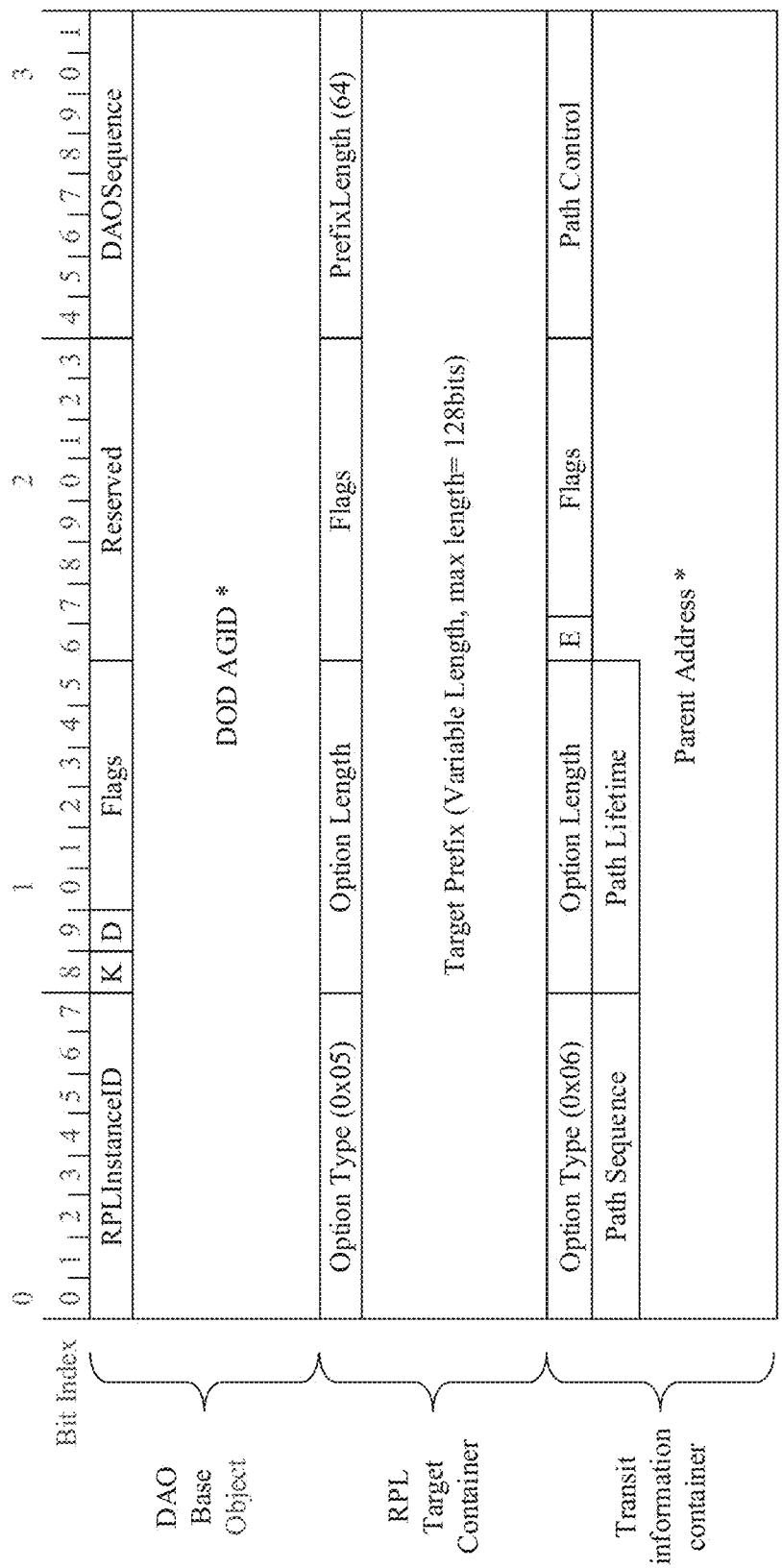
FIG. 9 (a) illustrates a conventional DAO object.

It is well known that every RPL message is divided into base message fields and additional containers. The base fields apply to the message as a whole and containers may be applied to specific targets. Referring to FIG. 9(a) illustrates a DAO base object as available in the prior-art.

According to the present invention, a DAO Message format is changed for:
  i. Invalidate Route (I flag): The target node could decide whether a NPDAO should be generated on its behalf by the common ancestor node. Thus a non-target node is generating a NPDAO at the behest of the target node. A DAO message could contain multiple targets and this flag impact a particular target, thus this flag has to be in context to individual target, and thus needs to be held in the container. Either "RPL target" container or the "Transit Information" container could be used carry this bit. This document uses "Transit Information container" to carry this bit.
  ii. Reverse DAO flag (R flag): The NPDAO generated as part of this process needs to flow downstream. Currently it is assumed that all DAO messages including NPDAO only traverse upstream. Thus for sending a downstream NPDAO a flag has to be added in context to the target. This flag applies to the complete NPDAO message and thus this flag needs to be kept at DAO base message level and not at the container level.

Figure 9B:
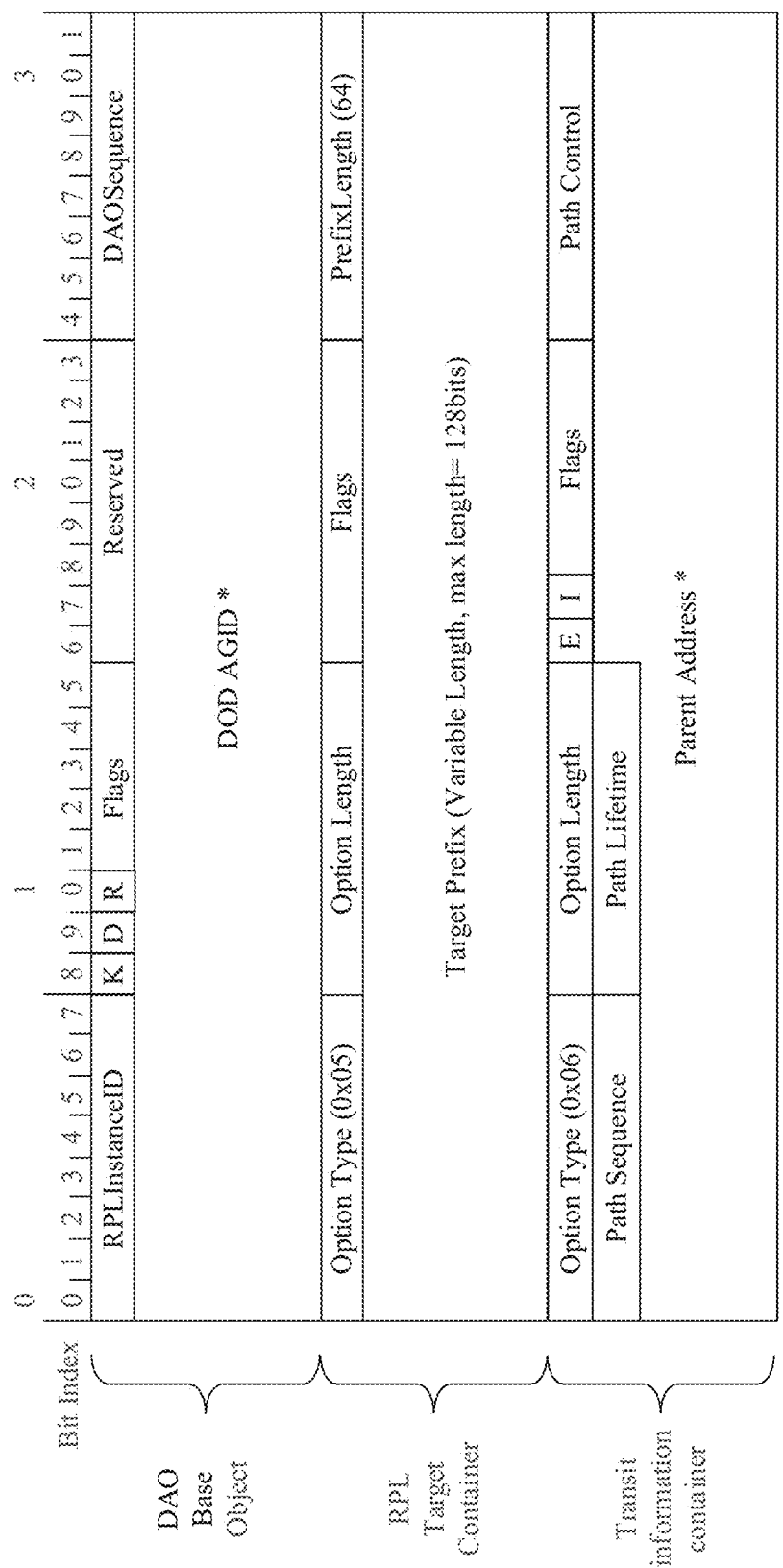

Referring now to FIG. 9(b) illustrates new flags required in DAO base object and transit information container, in accordance with an embodiment of the present invention. As shown in the FIG. 9(b), the new flags are added in the base object and are highlighted.

Figure 10:
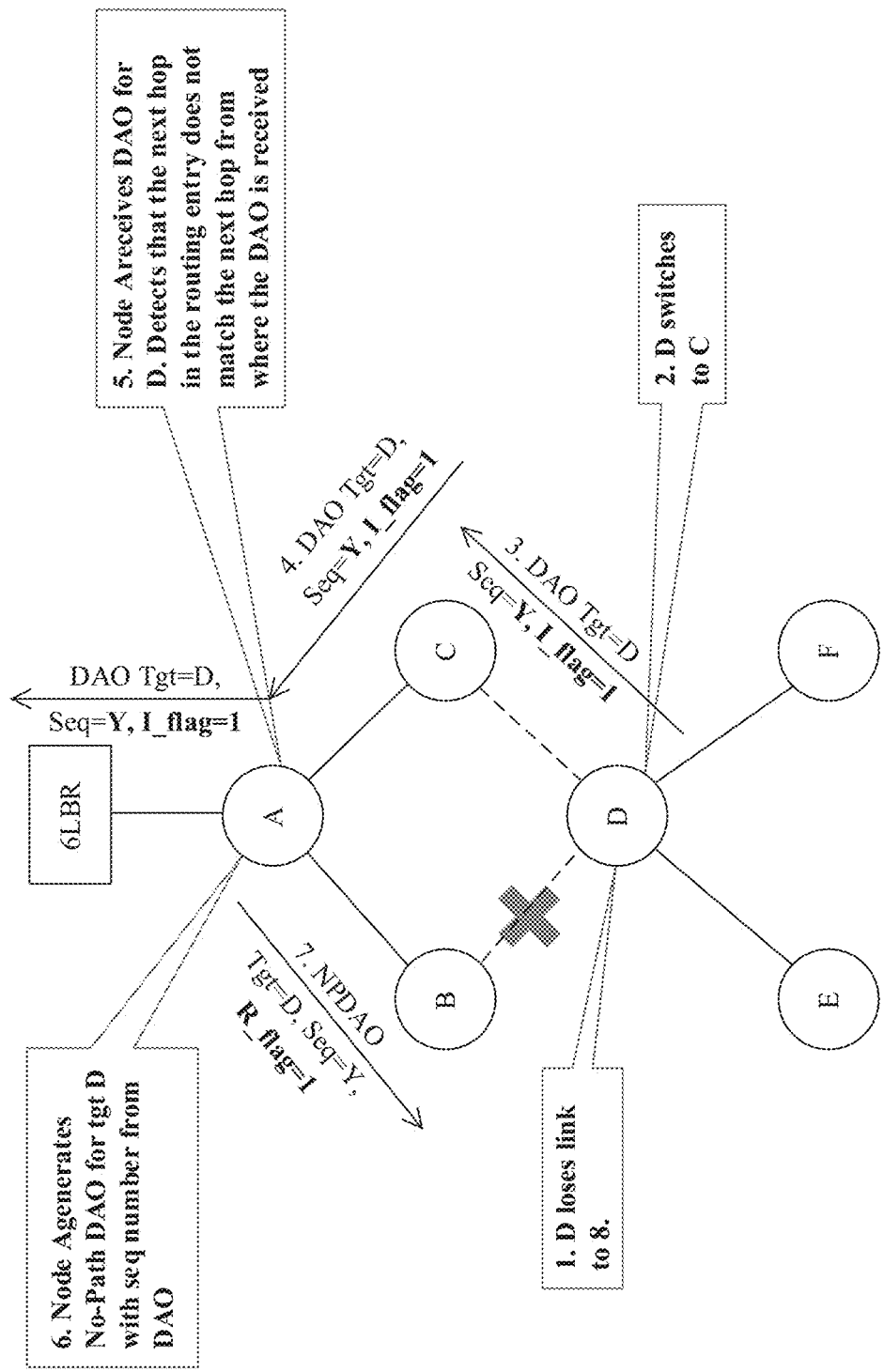
FIG. 10 illustrates working/use of new flags in DAO base object, in accordance with an embodiment of the present subject matter.

Referring now to FIG. 10, use of I_flag, R_flag and Seq(PathSeq) is shown in accordance with an embodiment of the present invention. As shown in FIG. 10, node (D) looses link to its current parent node (B) and accordingly the node (D) switches its parent to new parent, node (C). Node (D) after switching to node (C) communicates a DAO message destined to border router for record and future communication. Accordingly, the I_flag bit and the Seq (PathSeq) bits are set to 1 as the parent is switched in this case; otherwise the bits are set to 0. When Node (A) which is a common ancestor of Node (D) receives the DAO message, Node (A) detects that the next hop in the routing entry does not match with the next hop from where the DAO is received. Upon detection of such change, a NPDAO is generated by the Node (A) of behalf of Node (D) with the sequence number from DAO.

According to RFC6550—the RPL specification, a PathSequence is associated with every target's transit information which specifies the freshness of the information. Every router stores this PathSequence in context to the target information in the routing table whenever it receives a DAO and matches this with the incoming PathSequence in the DAO message.

The PathSequence is used as follows to decide whether to accept or drop the DAO message:

DAO_msg->target->PathSequence <= routingEntry->PathSequence [Drop the DAO message]
DAO_msg->target->PathSequence > routingEntry->PathSequence [Accept and process this DAO message]

According to the present invention, a non-target node i.e. a common ancestor generates an NPDAO on behalf of the target/switching node. Thus a choice of PathSequence becomes very important since choosing incorrect PathSequence may lead to either the NPDAO not getting honored or worst it may lead to invalidation of valid route. Also, according to the present invention, the common ancestor reuse the same PathSequence from the regular DAO based on which the NPDAO is getting generated.

In one implementation, a modified routing table structure may be as follows:

```
struct_routingEntry_{
  ipv6addr_t target;
  uint8_t pathSeq; //Last received PathSequence in DAO message
  uint16 lifetime;
  struct nbrEntry *nexthop; //nexthop for routing
  ...
}routingEntry_t;
```

The dependent nodes route invalidation can be handled in the same way as the switching node. Note that there is no way that dependent nodes can set the I_flag in the DAO message since they are unaware that their parent node is switching paths. There are two ways to handle dependent node route invalidation:

i. One way to resolve is that the common ancestor does not depend upon the I_flag to generate the reverse NPDAO. The only factor it makes the decision will be based on next hop change for an existing target to generate the NPDAO. Thus when the switching nodes and all the below dependent nodes advertise a regular DAO, the common ancestor node will detect a change in next hop and generate NPDAO for the same target as in the regular DAO.

ii. Another way is that the nodes always set the I_flag whenever they send regular DAO. Thus common ancestor will first check whether I_flag is set and then check whether the next hop has changed and subsequently triggering NPDAO if required.

In one implementation, the present invention follows point 2 above. The advantage with I_flag is that the generation of downstream NPDAO becomes more deterministic and the target node is still in control of its own routing state.

In one implementation, according to the present invention, the route invalidation problems mentioned in background section above do not impact non-storing mode since no routing tables are maintained in non-storing mode on intermediate routers. Thus the I-flag and R-flag will be unused in non-storing mode.

Conventionally, the RPL allows a node to send the same DAO through multiple parents, thus allowing establishment of multiple paths. The present invention works transparently for this scenario.

In one implementation, I_flag is used by the target node to inform the common ancestor to send an NPDAO. But an implementation may choose to not use this flag and make common ancestor decide by itself on whether to generate NPDAO for a given target on receiving a regular DAO.

In IoT networks, such as home/building automation, Smart Meter networks, the network may form in an ad-hoc fashion. This requires multi-hop mesh network formation capabilities. With mesh based networks the routes are dynamically created and deleted. The process of route deletion is also called route invalidation which is optimized according to the present invention.

Figure 11:
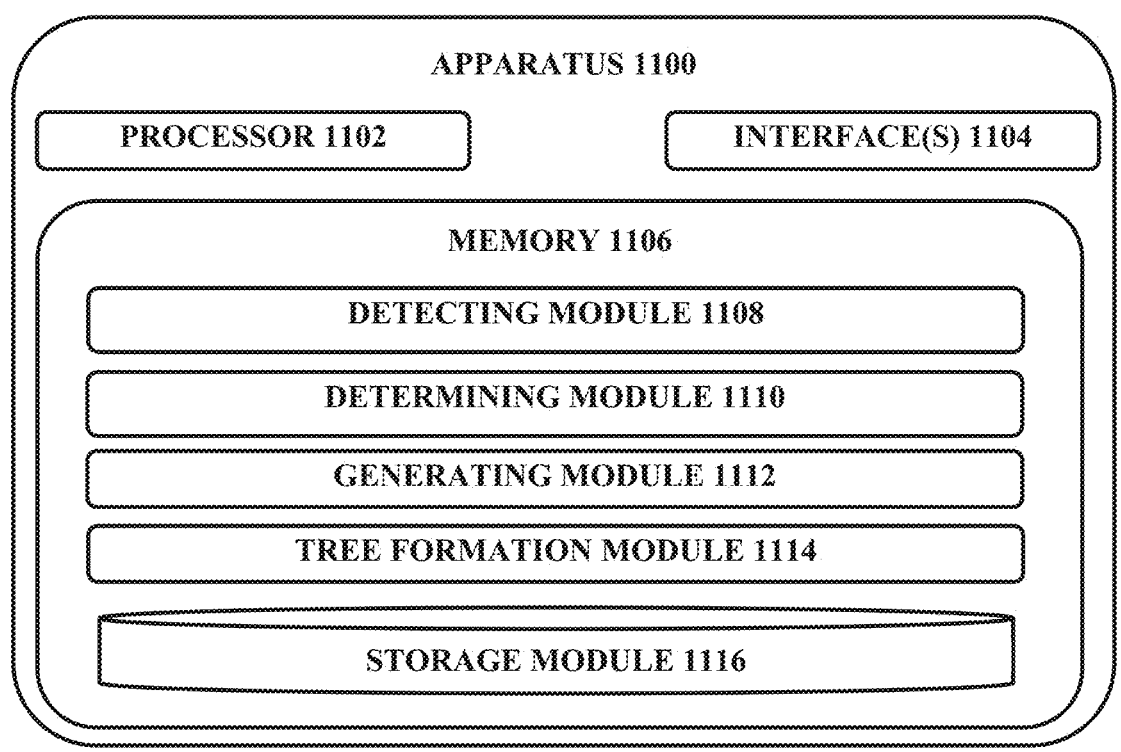
FIG. 11 illustrates an apparatus for invalidating a routing path on switching of a parent node in a network, in accordance with an embodiment of the present subject matter.

Referring now to FIG. 11, an apparatus 1100 for invalidating a routing path on switching of a parent node is disclosed. In one embodiment, the apparatus is a common ancestor node as shown in FIG. 5.

Although the present subject matter is explained considering that the apparatus 1100 is implemented as a data center, it may be understood that the apparatus 1100 may also be implemented in a variety of computing systems, such as a laptop computer, a desktop computer, a notebook, a workstation, a mainframe computer, a server, a network server, and the like. It will be understood that the apparatus 1100 may be accessed by multiple users through one or more user devices. Examples of the user devices may include, but are not limited to, a portable computer, a personal digital assistant, a handheld device, and a workstation. The apparatus 1100 is communicatively coupled to other nodes, through a network.

In one implementation, the network may be a wireless network, a wired network or a combination thereof. The network can be implemented as one of the different types of networks, such as intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

In one embodiment, the apparatus 1100 may include at least one processor 1102, an input/output (I/O) interface 1104, and a memory 1106. The at least one processor 1102 may be implemented as one or more microprocessors, microcomputers, microcontrollers, digital signal processors, central processing units, state machines, logic circuitries, and/or any devices that manipulate signals based on operational instructions. Among other capabilities, the at least one processor 1102 is configured to fetch and execute computer-readable instructions stored in the memory 1106.

The I/O interface 1104 may include a variety of software and hardware interfaces, for example, a web interface, a graphical user interface, and the like. The I/O interface 1104 may allow the apparatus 1100 to interact with a user directly or through the client devices 1104. Further, the I/O interface 1104 may enable the apparatus 1100 to communicate with other computing devices, such as web servers and external data servers (not shown). The I/O interface 1104 can facilitate multiple communications within a wide variety of networks and protocol types, including wired networks, for example, LAN, cable, etc., and wireless networks, such as WLAN, cellular, or satellite. The I/O interface 1104 may include one or more ports for connecting a number of devices to one another or to another server.

The memory 1106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 1106 may include logics for performing respective functions of the apparatus 1100.

In one first embodiment, the apparatus 1100 for invalidating a routing path on switching of a parent node includes a processor; and a memory coupled to the processor for executing a plurality of modules present in the memory. The plurality of modules includes a determining module 1110 and a generating module 1112. The determining module 1110 is adapted to determine switching of the parent node associated with at least one node based on at least one update message received from the at least one node using a new routing path established on switching of the parent node. The generating module 1112 is adapted to generate at least one No-Path message for invalidating the routing path associated with the at least one node on switching of the parent node.

In one first detailed implementation of the first embodiment, the apparatus 1100 further includes a tree formation module 1114. The tree formation module 1114 adapted to represent the network by a Destination Oriented Directed Acyclic Graph (DODAG). The nodes in the graph represent at least the parent node, the common ancestor node, or the node, and the common ancestor node is a root nodes root in the DODAG, and directed edges represent the links between the node, wherein the at least one common ancestor node of the network is a node having at least two nodes as descendants (the parent node and/or the nodes) in the DODAG.

In one first detailed implementation of the first embodiment, the at least one update message is a destination oriented directed acyclic graph advertisement object (DAO) message, and the at least one No-Path message is a No-Path destination oriented directed acyclic graph advertisement object message (NPDAO) message.

In one second detailed implementation of the first embodiment, the apparatus 1100 further includes a detecting module 1108. The detecting module 1108 is adapted to detect that the at least one update message received from the at least one node is different from the at least one update message received earlier.

In one first detailed implementation of the first embodiment, the determining module 1110 is further adapted to determine switching of the parent node associated with the at least one node for generating the at least one No-Path message by utilizing a Path sequence form the at least one update message received.

In one third detailed implementation of the first embodiment, the apparatus 1100 further includes a storage module 1116. The storage module 1116 is adapted to store a Path sequence associated the at least one node before switching of the path, wherein when the at least one update message received, the Path sequence form the at least one update message received is compared with the pre-stored Path sequence associated the at least one node, and thereby generating the at least one No-Path message.

In one fourth detailed implementation of the first embodiment, the at least one update message received from the at least one node comprises at least one bit, representing invalidating the routing path, placed in at least a target container or at least a transit information container or any combination thereof, the at least one bit authorizing generation of the at least one No-Path message by the at least one common ancestor node.

In one fifth detailed implementation of the first embodiment, the at least one No-Path message generated comprises at least one bit, representing reverse flag, adapted to traverse the No-Path message downstream/reverse, and placed in a base message level of the No-Path message.

In one second embodiment, the apparatus 1100 for invalidating a routing path on switching of a parent node in a network is disclosed. The network is represented by a Destination Oriented Directed Acyclic Graph (DODAG), the nodes in the graph represent at least the parent node, at least a common ancestor node, or at least a node, and the common ancestor node is a root nodes root in the DODAG, and directed edges represent the links between the node for routing packets between the nodes. The apparatus 1100 includes a determining module 1110 and a generating module 1112. The determining module 1110 adapted to determine switching of the parent node associated with the at least one node based on at least one a destination oriented directed acyclic graph advertisement object (DAO) message received from the at least one node using a new routing path established on switching of the parent node. The generating module 1112 adapted to generate at least one No-Path destination oriented directed acyclic graph advertisement object message (NPDAO) message for invalidating the routing path associated with the at least one node on switching of the parent node.

In one first detailed implementation of the second embodiment, the apparatus 1100 further includes an interface 1104 adapted to receive the DAO message from the at least one node. The determining module 1110 upon receiving the DAO message is further adapted to determine a mismatch in a next hop of a routing entry associated with a Path sequence pre-stored against a next hop of a routing entry associated with a Path sequence of the DAO message received. The generating module 1112 is further adapted to generate at least one No-Path destination oriented directed acyclic graph advertisement object message (NPDAO) message for invalidating the routing path associated with the at least one node on switching of the parent node.

In one second detailed implementation of the second embodiment, the routing uses a Routing Protocol for Low Power and Lossy Networks (RPL).

In one second detailed implementation of the second embodiment, the NPDAO message traverses downward/downstream along the Path sequence of the DAO message received.

In one second detailed implementation of the second embodiment, the at least one update message received from the at least one node comprises at least one bit, representing invalidating the routing path, placed in at least a target container or at least a transit information container or any combination thereof, the at least one bit authorizing generation of the at least one No-Path message by the at least one common ancestor node.

In one second detailed implementation of the second embodiment, the at least one No-Path message generated comprises at least one bit, representing reverse flag, adapted to traverse the No-Path message downstream/reverse, and placed in a base message level of the No-Path message.

In one third detailed implementation of the second embodiment, the apparatus 1100 further includes a utilizing module adapted to utilize the Path sequence from the at least one DAO message to generate the NPDAO message.

Figure 12:
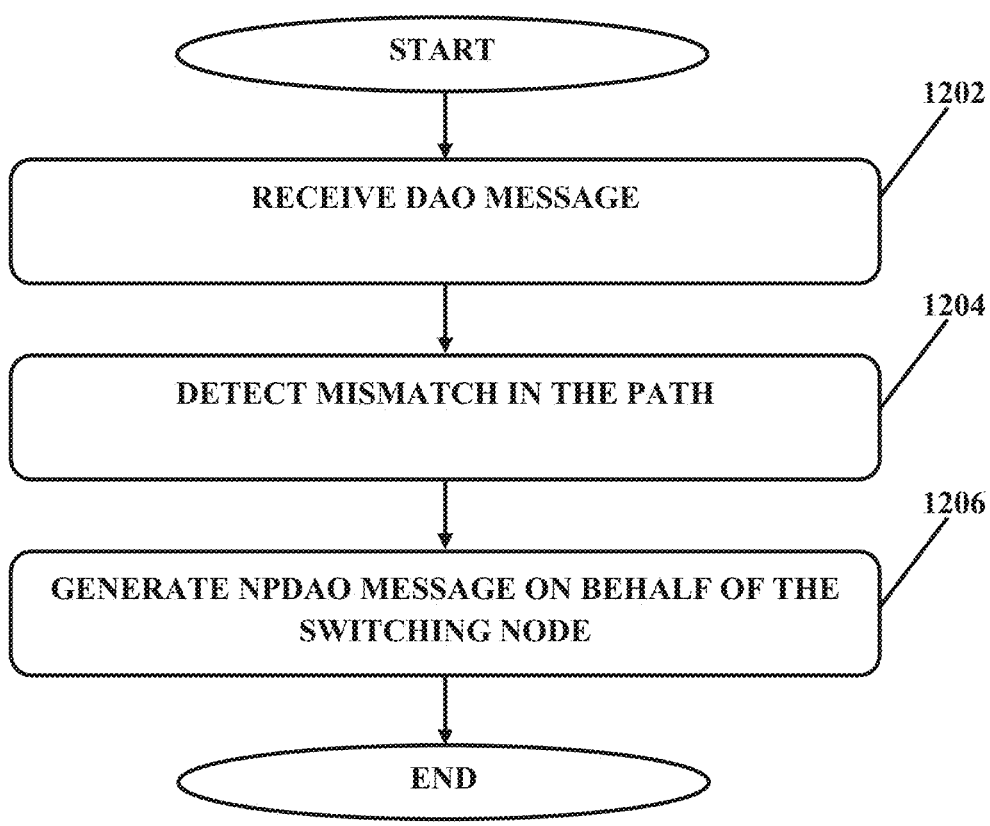
FIG. 12 illustrates a method for invalidating a routing path on switching of a parent node in a network, in accordance with an embodiment of the present subject matter.

Referring to FIG. 12, a method for invalidating a routing path on switching of a parent node is illustrated, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, software, firmware, or combination thereof. However, for ease of explanation, in the embodiments described below, the method may be considered to be implemented in the above described apparatus 1100.

Referring now to FIG. 12, at step 1202 a common ancestor node/apparatus 1100 receives a DOA message form a switching node in the network.

At step 1204, common ancestor node/apparatus 1100 receives a DAO for a target and finds a mismatch in next hop. Mismatch is detected in the next hop in routing entry versus the next hop from which DAO is received.

At step 1206, using the changed signaling, the common ancestor node generates an NPDAO on behalf of the target node on receiving a refreshed DAO from an alternate path. The common ancestor node is in charge of generating a No-Path DAO on behalf of the switching node.

In one embodiment, the method for invalidating a routing path on switching of a parent node, includes determining, by at least one common ancestor node of a network, switching of the parent node associated with at least one node based on at least one update message received from the at least one node using a new routing path established on switching of the parent node; and generating, by the at least one common ancestor node, at least one No-Path message for invalidating the routing path associated with the at least one node on switching of the parent node.

In one embodiment, the method for invalidating a routing path on switching of a parent node in a network is disclosed. The network is represented by a Destination Oriented Directed Acyclic Graph (DODAG), the nodes in the graph represent at least the parent node, at least a common ancestor node, or at least a node, and the common ancestor node is a root nodes root in the DODAG, and directed edges represent the links between the node for routing packets between the nodes. The method includes determining, by the at least one common ancestor node of the network, switching of the parent node associated with the at least one node based on at least one a destination oriented directed acyclic graph advertisement object (DAO) message received from the at least one node using a new routing path established on switching of the parent node; and generating, by the at least one common ancestor node, at least one No-Path destination oriented directed acyclic graph advertisement object message (NPDAO) message for invalidating the routing path associated with the at least one node on switching of the parent node.

Application Scenarios

Smart Meter Scenario: Thousands of smart meters interconnect via each other to form a mesh network. The upstream nodes usually take a higher load since the entire downstream nodes route through them. If route invalidation does not work optimally then upstream nodes suffer because in case of contention i.e. in case they receive route add request and if the route table is full then evicting the stale entry is difficult since the route invalidation does not function optimally. The implementation of the present invention in the network improves the route invalidation operation significantly and thus improves route table usage efficiency.

General IoT Solutions: Any wireless/wired IoT or MANET (Mobile Ad-hoc network) solution which uses multi-hop mesh based network formation will benefit from the present invention. This includes but not limited to Home automation, Smart city solution based on BLE (Bluetooth Low Energy), LoWPAN/802.15.4, or adhoc WiFi.

Apart from what is discussed above, the present invention also includes some additional technical benefits, few of them are mentioned below:

i. Routing table reflects latest state of network topology.

ii. Improved memory utilization: Improves route invalidation and thus improves resource utilization on constrained nodes. In earlier case, a nodes routing table could become bloated because of stale route entries. By implementing the present invention, because of efficient route invalidation, the stale route entries are minimized.

iii. Reduced control traffic: NPDAO signaling path is significantly reduced. In earlier case, an NPDAO traversed a complete path from the target node to all the way till border router. By implementing the present invention, the NPDAO path is limited between common ancestor nodes to the switching node's previous preferred parent.

iv. Dependent Node route invalidation: Current RPL specification does not cater to dependent nodes route invalidation altogether. By implementing the present invention, route invalidation works for dependent nodes as well.

v. P2P traffic: Improved efficiency of P2P traffic, by reducing downtime caused due to invalid route entries.

vi. Reduced route downtime: The present invention results in synchronous operation of regular DAO and NPDAO thus reducing possibility of route downtime.

vii. The present invention provides a new signaling mechanism for route invalidation in constrained networks.

viii. The present invention enables generation of NPDAO by a common ancestor node rather than the target node itself. As per this claim, the NPDAO on behalf of the target node is generated by common ancestor node.

ix. The present invention enables downstream signaling of NPDAO as compared to upstream signaling as per the current standard.

x. The present invention enables common ancestor node to detect routing anomaly using next hop mismatch on reception of regular DAO to generate NPDAO on behalf of the target node xi. The present invention enables the common ancestor node to reuse the state information of regular DAO to generate NPDAO. One of the primary parameters of this state information is the PathSequence number.

xii. The present invention enables node sends parent information in DAO message which gets stored in routing table along with other information.

xiii. According to the present invention, same common ancestor node is in charge of generating a downstream/reverse NPDAO for the switching node and all the dependent nodes, the aggregation of such NPDAO messages becomes computationally efficient and less complex in terms of program memory.

xiv. The present invention enables synchronous operation of DAO and NPDAO i.e. generation of NPDAO in response to a regular DAO at common ancestor results in reduced route downtime It may be understood by the person skilled in the art that though the present invention is discussed in context to Low power and lossy networks but it can also be used in context to Mobile Ad-hoc networks (MANET) or any other ad-hoc/mesh based topology formation scenario.

It may be understood by the person skilled in the art that any routing protocol is based on similar semantics. Thus the present invention may be used in conjunction with routing protocol for improved route invalidation.

It may be understood by the person skilled in the art that though the present invention uses RPL as an example to discuss about network formation. But essentially any proactive routing protocol which supports routing metrics/constraints can be used. Other examples of proactive routing protocols are BABEL, RIP etc.

It may be understood by the person skilled in the art that the DAO messages can be aggregated i.e. multiple DAO messages can be clubbed into single message and then transmitted to reduce network traffic overhead. The idea should work transparently with aggregated messages as well.

A person skilled in the art may understand that any known or new algorithms by be used for the implementation of the present invention. However, it is to be noted that, the present invention provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer node (which may be a personal computer, a server, or a network node) to perform all or a part of the steps of the methods described in the embodiment of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Devices that are in communication with each other need not be in continuous communication with each other, unless expressly specified otherwise. In addition, devices that are in communication with each other may communicate directly or indirectly through one or more intermediaries.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Although implementations for apparatus and method for optimized route invalidation using modified no-path DAO signaling have been described in language specific to structural features and/or methods, it is to be understood that the appended claims are not necessarily limited to the specific features or methods described. Rather, the specific features and methods are disclosed as examples of implementations of apparatus and method for optimized route invalidation using modified no-path DAO signaling.

The invention claimed is:

1. A method, comprising:
   determining, by a common ancestor node of a network, switching of a parent node of a node based on an update message received from the node using a new routing path established based on the switching of the parent node; and
   generating, by the common ancestor node, a No-Path message based on the update message, wherein the No-Path message is for invalidating a previous routing path associated with the node on the switching of the parent node, wherein the update message comprises at least one bit authorizing generation of the No-Path message by the common ancestor node, and wherein the at least one bit is placed in a transit information option in the update message.

2. The method as claimed in claim 1, wherein the common ancestor node is an upstream node common on both of a new routing path and a previous routing path in a Destination Oriented Directed Acyclic Graph (DODAG) representing the network, and wherein the common ancestor node is a node having at least two nodes as descendants in the DODAG.

3. The method as claimed in claim 1, wherein the previous routing path associated with the node is a path established before the switching of the parent node of the node.

4. The method as claimed in claim 1, wherein the update message is received from the node while the new routing path is established in the network upon the switching of the parent node.

5. The method as claimed in claim 1, wherein the node and the common ancestor node are communicably coupled.

6. The method as claimed in claim 1, wherein the update message is based on a destination oriented directed acyclic graph advertisement object (DAO) message.

7. The method as claimed in claim 1, wherein the common ancestor node determines the switching of the parent node of the node for generating the No-Path message by:
   determining a mismatch in a next hop of a routing entry associated with a path sequence pre-stored in the common ancestor node against a next hop of a routing entry associated with a path sequence of the update message received.

8. The method as claimed in claim 1, wherein the common ancestor node determines the switching of the parent node of the node for generating the No-Path message by utilizing a path sequence from the update message received.

9. An apparatus, comprising:
   at least one processor; and
   one or more memories coupled to the at least one processor and storing programming instructions for execution by the at least one processor to:
      determine switching of a parent node of a node based on an update message received from the node using a new routing path established based on the switching of the parent node; and
      generate a No-Path message based on the update message, wherein the No-Path message is for invalidating a previous routing path associated with the node on the switching of the parent node, wherein the update message comprises at least one bit authorizing generation of the No-Path message by a common ancestor node, and wherein the at least one bit is placed in a transit information option in the update message.

10. The apparatus as claimed in claim 9, wherein the apparatus is the common ancestor node, wherein the common ancestor node is a root node in a Destination Oriented Directed Acyclic Graph (DODAG) representing a network, and wherein the common ancestor node is a node having at least two nodes as descendants in the DODAG.

11. The apparatus as claimed in claim 10, wherein the update message is based on a destination oriented directed acyclic graph advertisement object (DAO) message.

12. The apparatus as claimed in claim 10, wherein the programming instructions are for execution by the at least one processor to:
   determine a mismatch in a next hop of a routing entry associated with a path sequence pre-stored in the apparatus against a next hop of a routing entry associated with a path sequence of a DAO message received.

13. The apparatus as claimed in claim 10, wherein the programming instructions are for execution by the at least one processor to:
   determine the switching of the parent node of the node for generating the No-Path message by utilizing a path sequence from the update message received.

14. The apparatus as claimed in claim 10, wherein the programming instructions are for execution by the at least one processor to:
   store a path sequence associated with the node before switching of the parent node, wherein when the update message is received, a path sequence from the update message received is compared with a pre-stored path sequence associated with the node to generate the No-Path message.

15. A non-transitory computer-readable medium storing computer instructions, wherein the medium is used for a common ancestor node in a network, and wherein the computer instructions, when executed by one or more processors in the common ancestor node, cause the one or more processors to:
   determine switching of a parent node of a node based on an update message received from the node using a new routing path established based on the switching of the parent node; and
   generate a No-Path message based on the update message, wherein the No-Path message is for invalidating a previous routing path associated with the node on the switching of the parent node, wherein the update message comprises at least one bit authorizing generation of the No-Path message by the common ancestor node, and wherein the at least one bit is placed in a transit information option in the update message.

16. The non-transitory computer-readable medium as claimed in claim 15, wherein the update message is received from the node while the new routing path is established in the network upon the switching of the parent node.

17. The non-transitory computer-readable medium as claimed in claim 15, wherein the node and the common ancestor node are communicably coupled.

18. The non-transitory computer-readable medium as claimed in claim 15, wherein the update message is based on a destination oriented directed acyclic graph advertisement object (DAO) message.

19. The non-transitory computer-readable medium as claimed in claim 15, wherein the computer instructions further cause the one or more processors to:
   determine a mismatch in a next hop of a routing entry associated with a path sequence pre-stored in the common ancestor node against a next hop of a routing entry associated with a path sequence of the update message received.

20. The non-transitory computer-readable medium as claimed in claim 15, wherein the one or more processors determines the switching of the parent node of the node for generating the No-Path message by utilizing a path sequence from the update message received.

* * * * *